J. KAUFFMAN.
Side-Bar Vehicle.
No. 204,154. Patented May 28, 1878.
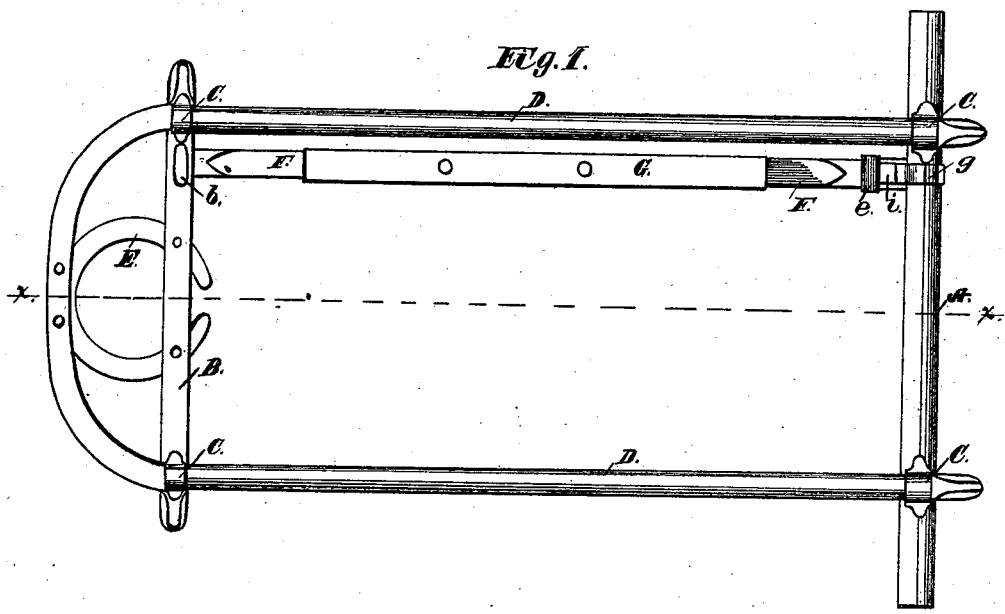
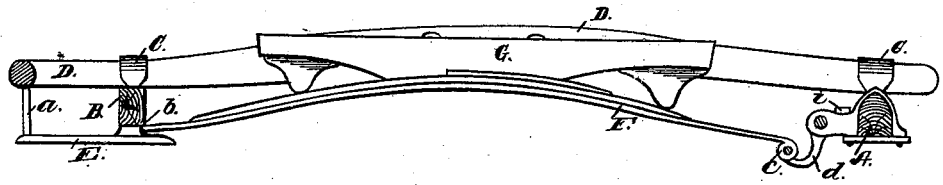
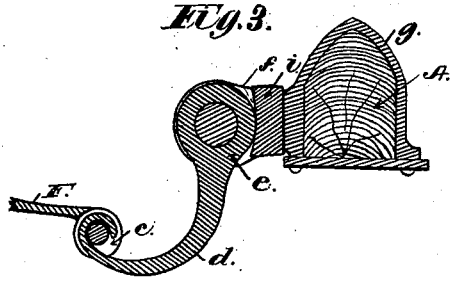
Witnesses:
Chas. M. Peck
P. H. Gunckel.
Inventor:
Jacob Kauffman
by his Attys;
Peck & Ritchie

UNITED STATES PATENT OFFICE.

JACOB KAUFFMAN, OF MIAMISBURG, OHIO.

IMPROVEMENT IN SIDE-BAR VEHICLES.

Specification forming part of Letters Patent No. 204,154, dated May 28, 1878; application filed April 27, 1878.

*To all whom it may concern:*

Be it known that I, JACOB KAUFFMAN, of Miamisburg, in the county of Montgomery and State of Ohio, have invented certain new and useful Improvements in Side-Bar Buggies; and I do hereby declare the following to be a full, clear, and exact description of the same.

This invention relates to that class of vehicles known as "side-bar buggies or wagons;" and my object is to secure strength combined with lightness and simplicity of construction.

My improvements consist in the construction and combination of the relative parts, combining elasticity with strength and simplicity, as will be herewith set forth.

In the accompanying drawing, Figure 1 is a plan view of my improved gear. Fig. 2 is a side elevation through the line $x$ $x$ of Fig. 1. Fig. 3 is an enlarged central section, in side elevation, of the shackle and link connection.

A is the rear axle, and B the bolster, of the frame or gear. Upon these is secured by clips C, in any suitable manner, the side bars D, which are constructed of a single piece of wood steamed and bent in the shape of a letter U, as indicated. The open ends of this double side bar are in the rear and extend over the axle A, as shown.

E is the fifth-wheel, bolted to the under side of the bolster and additionally braced by a hanger-bracket, $a$, extending from the under side of the bent portion of the side bar, as indicated in Fig. 2.

Just within each of the side bars, and supported by the bolster B and axle A, is a semi-elliptical spring, F, consisting of layers of leaves, upon which the bed-bar G is bolted. The forward end of the lower leaf is bent round to form a knuckle, which is hung upon a staple or clip, $b$, extending from the under side of the bolster.

The rear end of the leaf is formed into bearing-ears $c$, Fig. 3, between which is pivoted the lower end of the link $d$, curved as represented.

The upper end of this link is formed into a knuckle, $e$, which is pivoted, as shown, between the ears of the shackle $f$, which latter is secured to the forward face of the axle A by a clip, $g$.

To prevent rattling and jar I secure a rubber or other elastic block or piece, $h$, between the knuckle $e$ and the face of the shackle, as represented in Fig. 3.

By reference to Fig. 2 the shape and location of the bed-bar G are clearly shown. To the under side of the projecting ends of this bar I secure rubber springs $i$, of the shape shown, whose lower ends rest upon the leaves of the metal spring, as shown. By means of these rubber springs the weight and strain upon the metal springs are equalized and diffused, thus lessening the liability of breaking the latter.

The wagon-body rests and is secured upon the bars G in the usual manner.

By this arrangement and construction I obtain a gear which is both light and strong, and by making the side bars of a single piece bent, as described, the rigidity of the parts is effectually maintained, though I am aware that it is not new to construct the side bars of a single piece, as herein shown; also, that the use of rubber springs applied to the under side of the bed-bar is old when they rest upon rigid link-pieces.

Having thus fully described my invention, I claim—

The herein-described running-gear for vehicles, composed of the axle A, bolster B, and side bars D, made of a single piece and bent as shown, the fifth-wheel E, the semi-elliptical springs F, upon which are secured the bed-bars G, provided with rubber springs $i$ bearing upon the metal springs F, and the rear shackles $f$, provided with rubber springs $h$, the whole constructed and combined as and for the purpose specified.

Witness my hand this 28th day of March, A. D. 1878.

JACOB KAUFFMAN.

Witnesses:
P. H. GUNCKEL,
WM. RITCHIE.